(12) United States Patent
Chen

(10) Patent No.: US 8,788,489 B2
(45) Date of Patent: *Jul. 22, 2014

(54) EVALUATION OF WEB PAGES

(71) Applicant: Alibaba Group Holding Limited, George Town (KY)

(72) Inventor: Hua Chen, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 13/683,155

(22) Filed: Nov. 21, 2012

(65) Prior Publication Data

US 2013/0144873 A1 Jun. 6, 2013

Related U.S. Application Data

(63) Continuation of application No. 12/660,606, filed on Mar. 1, 2010, now Pat. No. 8,364,667.

(30) Foreign Application Priority Data

Mar. 4, 2009 (CN) .......................... 2009 1 0118150

(51) Int. Cl.
*G06F 17/30* (2006.01)

(52) U.S. Cl.
USPC ............ 707/723; 707/758; 709/203; 709/219

(58) Field of Classification Search
USPC ............... 707/723, 758, 999.01, 999.107; 709/203, 219
See application file for complete search history.

(56) References Cited

U.S. PATENT DOCUMENTS

| | | | |
|---|---|---|---|
| 6,658,423 B1 * | 12/2003 | Pugh et al. | 1/1 |
| 7,308,413 B1 * | 12/2007 | Tota et al. | 705/7.11 |
| 7,904,725 B2 * | 3/2011 | Pavlicic | 713/176 |
| 8,364,667 B2 * | 1/2013 | Chen | 707/723 |
| 2003/0120647 A1 * | 6/2003 | Aiken et al. | 707/3 |
| 2005/0060643 A1 * | 3/2005 | Glass et al. | 715/501.1 |
| 2007/0067304 A1 * | 3/2007 | Ives | 707/10 |
| 2008/0133540 A1 * | 6/2008 | Hubbard et al. | 707/10 |
| 2008/0288509 A1 * | 11/2008 | Mysen et al. | 707/100 |
| 2009/0055359 A1 * | 2/2009 | Gross | 707/3 |
| 2009/0327278 A1 * | 12/2009 | Baran-Sneh | 707/5 |
| 2010/0205665 A1 * | 8/2010 | Komili et al. | 726/12 |
| 2010/0241256 A1 * | 9/2010 | Goldstein et al. | 700/94 |

* cited by examiner

*Primary Examiner* — Leslie Wong
(74) *Attorney, Agent, or Firm* — Van Pelt, Yi & James LLP

(57) ABSTRACT

Determining a web page evaluation value includes is described herein. A plurality of web pages with the same or approximately the same content is obtained. A plurality of generation times and a plurality of first evaluation values that correspond to respective ones of the plurality of web pages is determined. A web page among the plurality of web pages that has the earliest generation time is identified. A second evaluation value of the identified web page according to the plurality of first evaluation values is determined.

15 Claims, 7 Drawing Sheets

2010 STATE OF THE UNION ADDRESS -WIKIPEDIA, THE FREE ENCYCLOPEDIA
THE 2010 STATE OF THE UNION ADDRESS WAS GIVEN BY UNITED STATES PRESIDENT BARACK OBAMA ON JANUARY 27, 2010, TO A JOINT SESSION OF CONGRESS. ...
EN.WIKIPEDIA.ORG/WIKI/2010_STATE_OF_THE_UNION_ADDRESS -
CACHED - SIMILAR -

REMARKS BY THE PRESIDENT IN STATE OF THE UNION ADDRESS |
THE WHITE ...
JAN 27, 2010 ... REMARKS BY THE PRESIDENT IN STATE OF THE UNION ADDRESS ....THAT IS WHY JOBS MUST BE OUR NUMBER-ONE FOCUS IN 2010, AND THAT'S WHY I'M ...
WWW.WHITEHOUSE.GOV/THE.../REMARKS-PRESIDENT-STATE-UNION-ADDRESS - CACHED -

STATE OF THE UNION 2010(FULL TEXT): READ OBAMA'S SPEECH
JAN 27, 2010 ... THE FULL TEXT OF PRESIDENT BARACK OBAMA'S STATE OF THE UNION ADDRESS, AS TRANSCRIBED BY THE WHITE HOUSE. MADAM SPEAKER, VICE PRESIDENT BIDEN ...
WWW.HUFFINGTONPOST.COM/2010/.../STATE-OF-THE-UNION-2010-FULL-TEXT-TRANSCRIPT_N_439459.HTML- CACHED -

>  STATE OF THE UNION ADDRESS 2010: TIME OF SPEECH, WHEN IT MAY END ...
> JAN 26, 2010 ... THE STATE OF THE UNION ADDRESSFOR 2010 IS SLATED TO START AT 9 PM EASTERN TIME AND 6 PM.
> WWW.HUFFINGTONPOST.COM/2010/.../STATE-OF-THE-UNION-ADDRES_N_437181.HTML - CACHED -

> ⊞ SHOW MORE RESULTS FROM WWW.HUFFINGTONPOST.COM

YOUTUBE - THE 2010 STATE OF THE UNION ADDRESS
PRESIDENT OBAMA SPEAKS ABOUT RESTORING SECURITY FOR MIDDLE CLASS FAMILIES AFTER A LOST DECADE OF DECLINING WAGES, ERODING RETIREMENT SECURITY AND ESCALATING ...
WWW.YOUTUBE.COM/WATCH?V=L1PWQTCDAYY- CACHED -

> YOUTUBE - IN FULL: STATE OF THE UNION
> PART 1| PRESIDENT OBAMA'S 2010 STATE OF THE UNION ADDRESS - 01/27/ ADDED TO. QUICKLIST10:11 · PART 1| PRESIDENT OBAMA'S 2010 STATE OF THE UNI. ...
> WWW.YOUTUBE.COM/WATCH?V=RTMRS9VPOQG - 23 HOURS AGO - CACHED -

FIG. 1A

REMARKS BY THE PRESIDENT IN STATE OF THE UNION ADDRESS | THE WHITE ...
JAN 27, 2010 ... REMARKS BY THE PRESIDENT IN STATE OF THE UNION ADDRESS .... THAT IS WHY JOBS MUST BE OUR NUMBER-ONE FOCUS IN 2010, AND THAT'S WHY I'M ...
WWW.WHITEHOUSE.GOV/THE.../REMARKS-PRESIDENT-STATE-UNION-ADDRESS - CACHED -
NUMBER OF WEB PAGES WITH REPRODUCED CONTENT: 156,257

STATE OF THE UNION 2010: PRESIDENT OBAMA'S FULL SPEECH TRANSCRIPT ...
JAN 27, 2010 ... EXCERPTS OF PRESIDENT OBAMA'S STATE OF THE UNION ADDRESS. THE STATE OF THE UNION TAKES PLACE AT THE US CAPITOL IN WASHINGTON, DC ON JAN.
ABCNEWS.GO.COM > POLITICS -

YOUTUBE - THE 2010 STATE OF THE UNION ADDRESS
PRESIDENT OBAMA SPEAKS ABOUT RESTORING SECURITY FOR MIDDLE CLASS FAMILIES AFTER A LOST DECADE OF DECLINING WAGES, ERODING RETIREMENT SECURITY AND ESCALATING ...
WWW.YOUTUBE.COM/WATCH?V=L1PWQTCDAYY - CACHED -

STATE OF THE UNION 2010 (FULL TEXT): READ OBAMA'S SPEECH
JAN 27, 2010 ... THE FULL TEXT OF PRESIDENT BARACK OBAMA'S STATE OF THE UNION ADDRESS, AS TRANSCRIBED BY THE WHITE HOUSE. MADAM SPEAKER, VICE PRESIDENT BIDEN ...
WWW.HUFFINGTONPOST.COM/2010/.../STATE-OF-THE-UNION-2010-FULL-TEXT-TRANSCRIPT_N_439459.HTML - CACHED -

2010 STATE OF THE UNION ADDRESS - WIKIPEDIA, THE FREE ENCYCLOPEDIA
THE 2010 STATE OF THE UNION ADDRESS WAS GIVEN BY UNITED STATES PRESIDENT BARACK OBAMA ON JANUARY 27, 2010, TO A JOINT SESSION OF CONGRESS. ...
EN.WIKIPEDIA.ORG/WIKI/2010_STATE_OF_THE_UNION_ADDRESS - CACHED - SIMILAR -

YOUTUBE - IN FULL: STATE OF THE UNION
PART 1| PRESIDENT OBAMA'S 2010 STATE OF THE UNION ADDRESS - 01/27/ ADDED TO.
QUICKLIST10:11 · PART 1|PRESIDENT OBAMA'S 2010 STATE OF THE UNI. ...
WWW.YOUTUBE.COM/WATCH?V=RTMRS9VPOQG - 23 HOURS AGO -CACHED -

FIG. 1B

EVALUATION OF WEB PAGES

CROSS REFERENCE TO OTHER APPLICATIONS

This application is a continuation of co-pending U.S. patent application Ser. No. 12/660,606, entitled EVALUATION OF WEB PAGES filed Mar. 1, 2010 which is incorporated herein by reference for all purposes, which claims priority People's Republic of China Patent Application No. 200910118150.1 entitled METHOD AND SYSTEM FOR DETERMINING AND APPLYING WEB PAGE EVALUATION VALUE, filed Mar. 4, 2009 which is incorporated herein by reference for all purposes.

FIELD OF THE INVENTION

This application relates to information processing technologies and, in particular, to a method and a system for determining and applying a web page evaluation value via a computer.

BACKGROUND OF THE INVENTION

A search engine crawls web pages on the Internet. When a user queries a search engine, the search engine finds all the web pages that are related to the user's keyword and then ranks the web pages in the order of their relevance degrees, starting with the most relevant web pages (i.e. web pages with the highest relevance degrees) first. Because the relevance degree of a web page is very complex and is calculated based on many parameters, there are various technical solutions for calculating the relevance degrees of web pages. Moreover, different search engine suppliers use different parameters and methods to calculate the relevance degrees of web pages.

For example, in 1997, Google proposed Page Rank, a parameter for improving the determination of relevance degrees of web pages. Page Rank may be understood as follows: a target web page linked from an important web page may obtain an important weight value; and the more important the web pages from which a target web page is linked, the higher Page Rank the target web page has, and thus the more important the target web page is deemed to be.

For the existing search engines, some problems often arise in the area of ranking search results with respect to content-type query words. Existing search engines generally discount the influence of web pages with the same or approximately the same content by using de-duplicate technology. For example, as a result of de-duplicate technology, some web pages with duplicated (i.e. reproduced) content may not be stored, not be displayed, or simply ranked low in the returned search results for a user's search query. According to the Page Rank method alone, if there is no appropriate link data, then the search engines may either ignore the original web page or rank it low but rank a web page with reproduced data much higher. Therefore, for existing search engines, the presence of different web pages with the same content have little or no influence on the relevance degree ranking of web pages.

BRIEF DESCRIPTION OF THE DRAWINGS

Various embodiments of the invention are disclosed in the following detailed description and the accompanying drawings.

FIG. 1A is an example result of a search engine that does not incorporate Copy Rank in its search results ranking method;

FIG. 1B is an example result of a search engine that incorporates Copy Rank in its search results ranking method;

DETAILED DESCRIPTION

Figure 2:
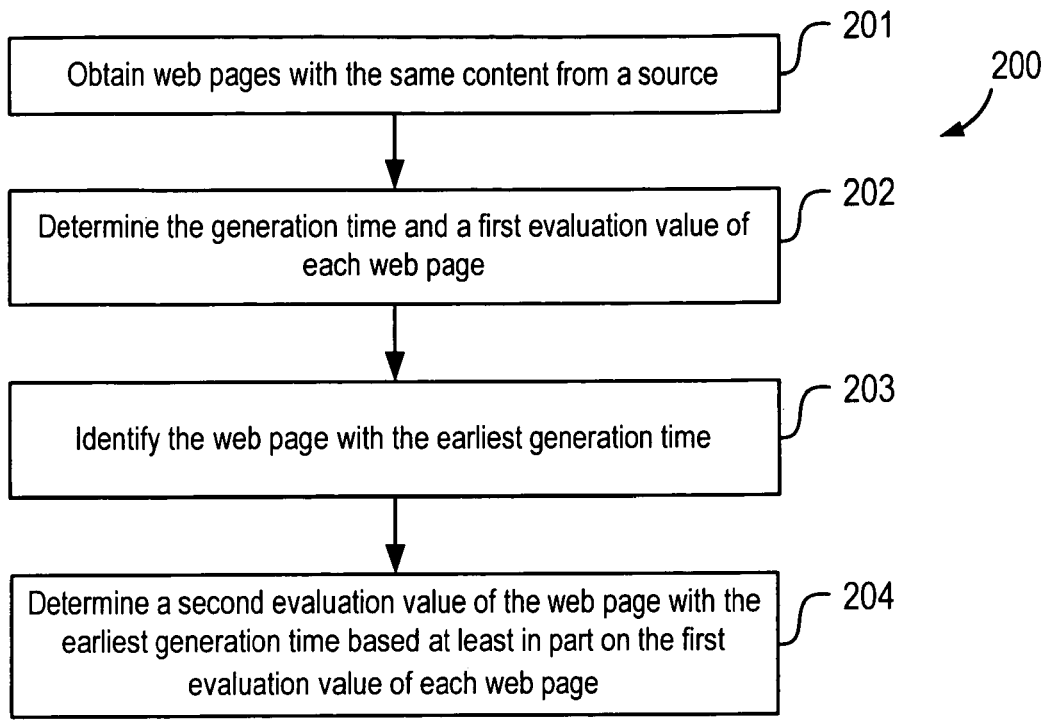
FIG. 2 is a flow chart of an embodiment of a process for determining a web page evaluation value.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A content-type web page often has few external links. Thus, the method for calculating Page Rank, which heavily relies on the existence of external links to determine the importance of web pages, does not work effectively for all web pages. As a result, the ranking of search results returned by using only the Page Rank method may not be in the order that is the most desirable to a user. Examples of content-type web pages may include, but is not limited to, web pages with news articles and web pages with general text content.

Current search engines often treat the occurrence of different web pages with the same content as a negative factor that interferes with the search results. Therefore, the search engines either discard such information regarding web pages or greatly lower the Page Rank of reproduced web pages. However, the occurrence of different web pages with the same content can actually play a very important role on the improvement of ranking search results.

To solve the above problems, in some embodiments a new ranking parameter, Copy Rank, is added to the result ranking method of a search engine to improve the search results of content-type query words. As used herein, Copy Rank is an evaluation value of a web page. Copy Rank represents a parameter for improving the ranking of search results based on their respective relevance degrees. The ranking of the search results of the content-type query can be improved by using the Copy Rank parameter. The Copy Rank of an original web page is calculated by using the number of times that the original content is reproduced on the Internet on different web pages and aggregating these web pages that feature the reproduced content. Hereinafter, web pages that feature the reproduced content of the original web page may sometimes be referred to as "reproduced web pages." Thus, a new relevance degree value of a web page is calculated by combining traditional parameters for calculating the relevance degree (such as the Page Rank and the keyword matching degree) with the proposed new parameter of Copy Rank. When the search engine displays the results, it may also display the number of times the content has been reproduced to help a user to quickly determine the best result on the Internet that relates to the query word.

FIG. 1A is an example result of a search engine that does not incorporate Copy Rank in its search results ranking method. In the example, the returned search results were for the search query "state of the union address 2010." In FIG. 1A, for example, the returned search results were ranked based on a method including at least the Page Rank parameter value of each returned web page but not a Copy Rank parameter value.

FIG. 1B is an example result of a search engine that incorporates Copy Rank in its search results ranking method. In the example, the search query was "state of the union address 2010." In FIG. 1B, for example, the returned search results were ranked based on a method based on at least the Page Rank parameter value and also the Copy Rank parameter value. The effect of the Copy Rank on the results of a search engine can be seen in this example. In the search results shown in the FIG. 1B, the web page with the highest Copy Rank parameter value is ranked and displayed at the top of search results. Copy Rank is determined, at least in part, on the number of times the web content is reproduced and the generation time of each of the returned web pages. Thus, in some embodiments, the more times that the content has been reproduced, the more likely it may be the content that is desired by a user. Also, the original page (e.g. web page that has the earliest generation time) is also most likely the web page that is most desired by the user. As a result, in some embodiments, the original web page is attributed a greater Copy Rank value than any of the other web pages with reproduced content. In the example of FIG. 1B, the top ranking and first displayed search result is the original web page and it is also displayed with the number times its content has been reproduced on other web pages.

In some embodiments, the determination of the Copy Rank includes three determinations: (1) determining whether the content of various web pages is basically the same; (2) determining the actual generation time of a web page; and (3) determining which web page is the original web page. Detailed illustration of the determinations will be given below.

FIG. 2 is a flow chart of an embodiment of a process for determining a web page evaluation value. Process 200 may be performed on a system such as 500 of FIG. 5. As shown in this example, process 200 starts at 201, where web pages with the same or approximately the same content are obtained from a source, such as a search engine server system. At 202, the generation time and a first evaluation value of each web page are determined. At 203, the web page with the earliest generation time is identified. At 204, a second evaluation value of a web page with the earliest generation time is determined, based at least in part on the first evaluation value of each web page with the same or approximately the same content. Process 200 will be explained in further detail below.

The purpose of 201 is to determine when different web pages contain the same or approximately the same content and use such information to improve the ranking of the search results, instead of discarding such information as negative factors that interfere with the search results.

In some embodiments, web pages with the same or approximately the same content include web pages with the same digital fingerprint. An example of a digital fingerprint is message-digest algorithm 5 (MD5). Digital fingerprints are widely used in encryption and decryption technology. Any file, no matter if it is an executable program, an image file, a temporary file, or any other type of file, and no matter what volume it has, has a statistically unique fingerprint value; and if the file is modified, its fingerprint value will also be changed. In other words, it may be verified whether the file is "modified" by comparing the fingerprint value of the file to the fingerprint value of the original file. To determine whether a later downloaded file is the same as the original file on a web site, fingerprint verification may be performed on the downloaded file. If the fingerprint value obtained is the same as the value of the file released on the web site, then it may be confirmed that the downloaded file is intact. If the values are different, then the downloaded file does not match the original (i.e. an error has occurred during the network downloading process or the file has been modified). Usually, a normal web site will provide fingerprint check code (such as an MD5 check code) of a file. Therefore, in some embodiments, it may be determined whether different web pages have the same or approximately the same content via their digital fingerprints.

In some embodiments, obtaining the web pages from a source such as a search engine server with the same or approximately the same content includes: generating a digital fingerprint (such as an MD5 check code) for selected content of a web page obtained from the source. Examples of the selected content includes the longest intermediate paragraph of the web page that has the longest content and is neither the first paragraph nor the last paragraph, or the longest sentence in a paragraph which is neither the first sentence nor the last sentence on the web page, or other appropriate content; and determining whether web pages have the same or approximately the same content based on the digital fingerprints of the selected content.

For example, in order to determine whether different web pages contain content that is the same, the longest intermediate paragraph, which is neither the first nor the last paragraph, is found in each article-type web page. Based on the selected content, an MD5 is generated based on the longest intermediate paragraph as the digital fingerprint of the web page. The digital fingerprint is the basis for determining whether the web page content is the same as that of another web page. But for an article that has no more than two paragraphs, the longest sentence in a paragraph, which is neither the first nor the last sentence, is taken to generate an MD5 digital fingerprint. Based on the selected content, an MD5 is generated as the digital fingerprint of the web page. If the digital fingerprints of the selected content of the two web pages are the same, then is it determined that the two web pages are at least approximately the same.

One reason for finding the longest intermediate paragraph that is neither the first paragraph nor the last paragraph or taking the longest sentence in a paragraph that is neither the first sentence nor the last sentence to generate the digital fingerprint of the web page is because, usually, the first paragraph and the last paragraph or the first sentence and the last sentence of a web page are more likely to be modified than intermediate paragraphs or sentences. Thus, the first or last paragraphs or sentences within a paragraph are not used to represent the actual content of the article in some embodiments. As such, the digital signature is generated according to a paragraph that is not the first paragraph or the last paragraph, or a sentence that is not the first sentence or the last sentence.

In some embodiments, the contents of two web pages may be determined to be the same via the MD5 checking results. It may be understood by one skilled in the art that 201, which obtains web pages with the same or approximately the same content, is not limited to determination via the MD5 technique only. Other methods that can determine whether the content of two web pages is consistent with each other may also be employed.

Returning to process 200, at 202, a generation time and a first evaluation value for each of the web pages with the same or approximately the same content are determined. Hereinafter, "generation time" includes, but is not limited to, the following: time at which the web content is published, time at which the web content is released, time at which the web page is crawled or a time which is mentioned by the web content itself. In some embodiments, the first evaluation value is Page Rank.

In some embodiments, determining the generation time of each web page includes determining the generation time of the web page according to the time contained in the Uniform Resource Locator (URL) of the web page, and/or, according to the time in an article-type web page.

In some embodiments, a mode of extraction via a computer software program may be employed to determine the actual release time of a web page. Because, currently, the web pages of most web sites are generated dynamically, the Last-modified (last time modified) field returned by a web page server is insignificant, and so the release time is preferably extracted from the text of the web page. The following method, for example, may be employed to extract the time:

First, determine whether a URL contains the time. For example, the URL in the following example contains the time:

≤http://news.sina.com.cn/w/2009-01-15/
184017052431.shtml.≥

Then, the time 2009-01-15 may be extracted via a program. In the some embodiments, the specific extraction measure may include: (A) a list of conventional time formats (such as yyyy-mm-dd, mm-dd-yyyy, etc.) are used to establish a time format table for storing the conventional time formats; (B) dividing a URL according to the delimiter (such as "/"); and/or (C) matching the divided portions with the time formats stored in the time format table, and if one portion matches the time format in the dimension table, then this indicates that the URL contains the time, and so this time may be extracted.

In some embodiments, no time is identified in the URL, but the time can still be obtained from the text of the article. There are various time formats in the text of the article. In some embodiments, the time may be found quickly by comprehensively tailoring the computer program to practical situations. For example, the text of the article in the example below contains the time:

China Network, 23:35, Dec. 27, 2009

"23:35, Dec. 27, 2009" may be extracted programmatically.

In some embodiments, the code of various time and date formats is analyzed and the time may be obtained via techniques such as regular expression matching. If the generation time cannot be determined based on the URL or the content of the page, then the time at which the page was crawled by the search engine may be taken as the generation time.

In some embodiments, the generation time is determined when a web page is crawled and a web page index is established; then the generation time is stored in a field of the web page index. In some embodiments, the time at which the article is first accepted in the index is used as the generation time of the article.

After the web pages with the same content and their respective generation times are determined, it is determined which one among the web pages is the original web page; that is, a web page with the earliest actual generation time is found among all of the same web pages and is taken as the original web page.

In some embodiments, the Page Rank is computed and used as a first evaluation value for each web page. However, other appropriate evaluation values such as values based on data regarding the links of other web pages may also be employed.

Page Rank is an evaluation value regarding the importance of a certain web page. A Page Rank value is different from a "Site Rank (web site evaluation value)". In other words, Page Rank is not an evaluation value of the whole web site but rather an evaluation of only an individual web page of a website (assuming each web site contains more than one web page). If the Page Rank of the home page of a web site is 5, then it only indicates that the Page Rank of that web page is 5, rather than that the Page Rank of the whole web site is 5. Thus, Page Rank is not directed to an entire web site; instead, it is directed to an individual page, which may be only one of multiple web pages of a web site.

The Page Rank value of a certain web page mainly comes from the influence of the pages linked to the page. So-called "all links" includes at least two kinds: external links that link outside the current web site and internal links that link to other pages inside the same, current web site. In other words, the Page Rank value of any page is generated via the combined influence of both external links and internal links, rather than being generated via the unilateral influence of only external links or only internal links. For example, the Page Rank of the home page of a web site is set to be 5 because there are two web pages linked by two external links with a Page Rank of 5, plus more internal links directing to the home page.

At 203, the original web page among the obtained web pages with the same or approximately the same content is determined. In some embodiments, the "original web page" is the web page with the earliest generation time.

At 204, a second evaluation value of the web page with the earliest generation time is determined based at least in part on the evaluation value of each web page with the same or approximately the same content. In some embodiments, the web page with the earliest generation time is referred to as the original web page. In some embodiments, the second evaluation of a web page may be represented by the Copy Rank parameter. In 204, the second evaluation value is determined as the product of the sum of the first evaluation values (e.g. Page Ranks) of web pages with the same or approximately the same content as the web page with the earliest generation time and a first weighting coefficient, plus the product of the first evaluation value of the web page with the earliest generation time and the second weighting coefficient. In some embodiments, the weight coefficients are set such that the total sum of the first evaluation values of the web pages with the same or approximately the same content receive a greater weight than the first evaluation value of the original web page alone.

In other words, in some embodiments, the Copy Rank gives an original web page the combined first evaluation values of all reproduced web pages. For example, the Copy Rank may be calculated according to the following formula:

Copy Rank of the original web page=Σfirst evaluation value of each reproduced web page*w1+first evaluation value of original web page*w2; where, w1 and w2 are the weighting coefficients, the values of w1 and w2 may be set as required in each implementation, and the values of w1 and w2 may be the same or different.

Additionally, in some embodiments, the Copy Rank may be generated after a web page is crawled. In some embodiments, the Copy Rank of each web page may be updated periodically.

In some embodiments, when an original web page is determined, a black list and/or a white list of a web site may also be established according to the historical data. In some embodiments, the web pages of the web sites on the white list are deemed to be original web pages, while the web pages of web sites on the black list are deemed to be non-original web pages. For example, as shown in FIG. 1B, www.whitehouse.gov may be deemed as a white listed original web site, while wikipedia.org may be deemed as a black listed non-original web site.

Figure 3:
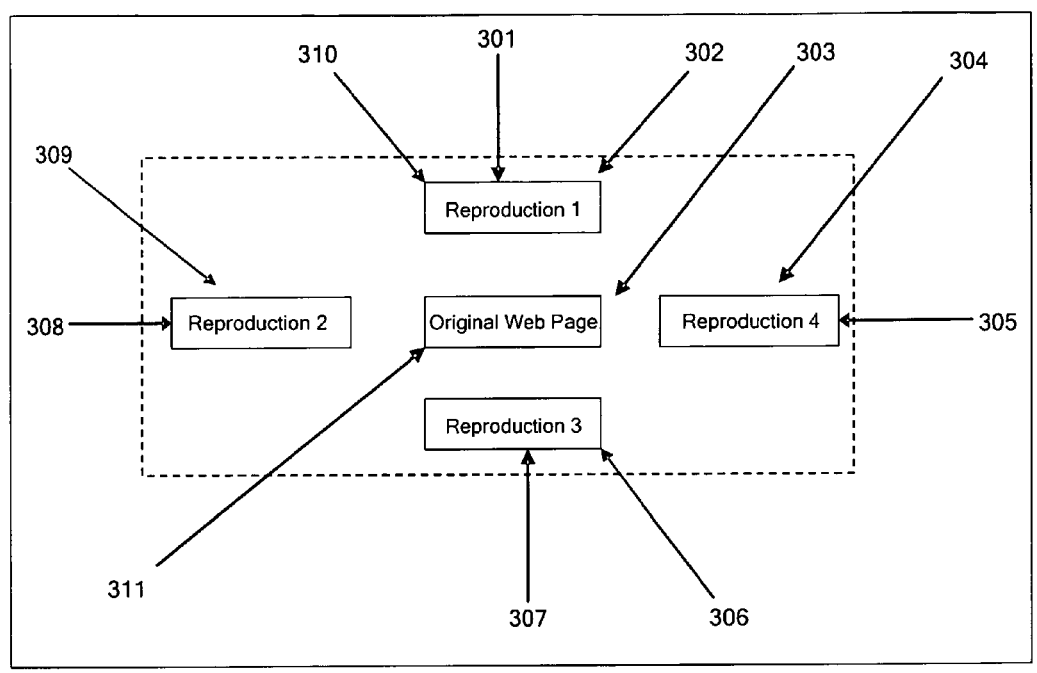
FIG. 3 is a diagram showing an embodiment of the relationship between the first evaluation value of a reproduced web page and the second evaluation value of an original web page.

FIG. 3 is a diagram showing an embodiment of the relationship between the first evaluation value of a reproduced web page and the second evaluation value of an original web page. As shown in FIG. 3, first evaluation values 301-310 of the reproduced web pages (i.e. "Reproduction 1," "Reproduction 2," "Reproduction 3," and "Reproduction 4") are aggregated to form the second evaluation value 311 of the original web page. In some embodiments, each of first evaluation values 301-310 is a Page Rank value, which is calculated based on the external and internal links to the web page. In some embodiments, the second evaluation value 311 is a Copy Rank value. In other words, FIG. 3 shows attributing the combined first evaluation values 301-310 (e.g. Page Ranks) of the reproduced web pages to the original web page in the form of a second evaluation value (e.g. Copy Rank) for the original web page.

Figure 4:
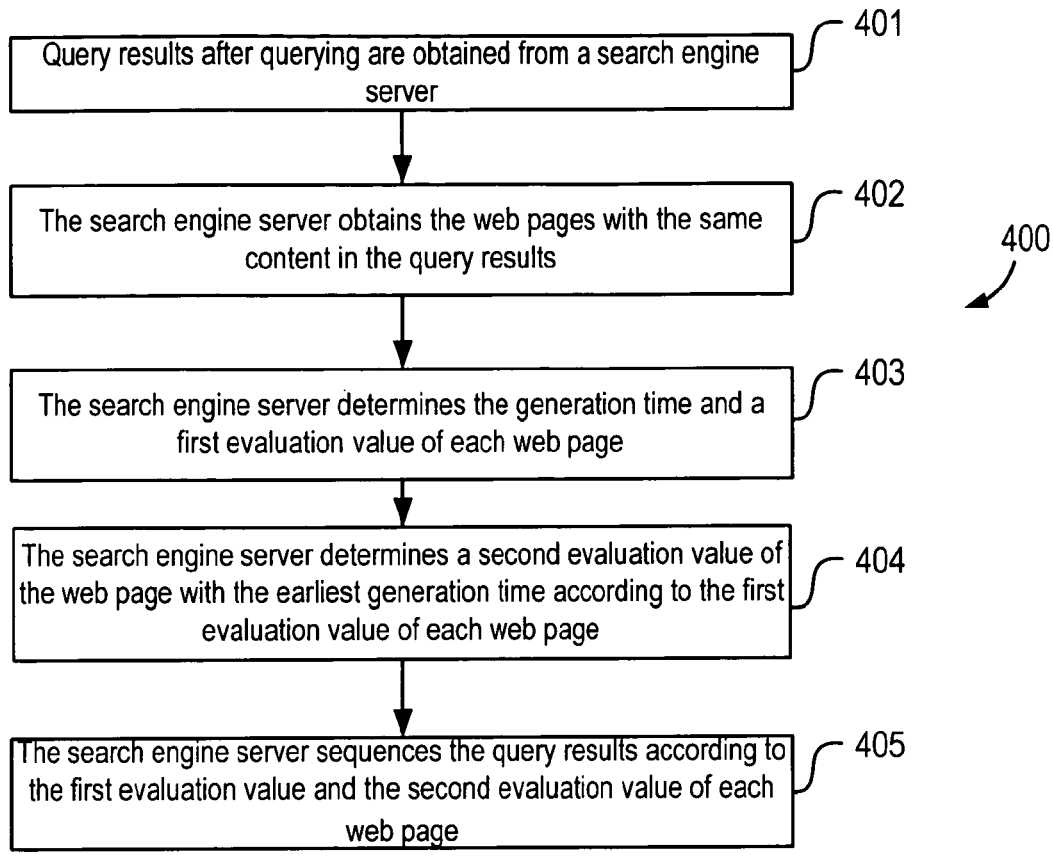
FIG. 4 is a flow chart of an embodiment of a process for ranking the query results according to the web page evaluation values.

FIG. 4 is a flow chart of an embodiment of a process for ranking the query results according to the web page evaluation values. Process 400 is performed by a search engine in this example. As shown in FIG. 4, the following may be included during the process in which web page evaluation values are applied to returning the query results for improving search accuracy:

At 401: query results comprising of web pages are obtained from a search engine server system in response to a query;

At 402: the search engine server system obtains the web pages of the query results with the same or approximately the same content;

At 403: the search engine server system determines the generation time and a first evaluation value of each web page;

At 404: the search engine server system determines a second evaluation value of the web page with the earliest generation time according to the first evaluation value of each web page;

At 405: the query results are ranked according to the first evaluation value of each web page and the second evaluation value. In some embodiments, the search engine server system may sequence the queried web pages according to the evaluation values. For example, the web pages may be ranked in sequence starting with the web page with the highest Copy Rank parameter value. In some embodiments, after the search engine server system ranks the web pages according to the evaluation values, it returns and displays them to the querying user. Moreover, the search engine server system may also display the number of reproduction times of each web page in the query result.

Based on the same concept, an embodiment of this application further provides a search engine server system that performs the above methods. Because such a search engine server system applies a technique of solving problems similar to that of the method for determining a web page evaluation value and that of the method for returning the query results according to the web page evaluation values, reference may be made to the embodiments of the methods for the implementation of the system, and the description thereof will be omitted.

Figure 5:
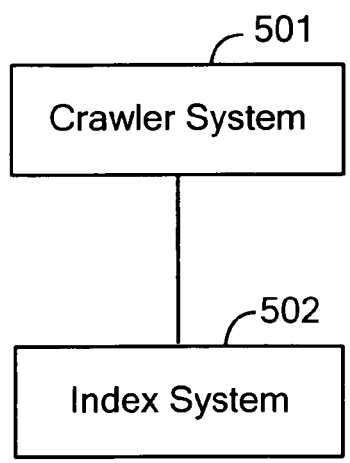
FIG. 5 is a block diagram illustrating an embodiment of a search engine server system.

FIG. 5 is a block diagram illustrating an embodiment of a search engine server system that implements Copy Rank. The crawler and index systems components and their sub systems can be implemented as software components executing on one or more processors, as hardware such as programmable logic devices and/or Application Specific Integrated Circuits designed to perform certain functions or a combination thereof. In some embodiments, the sub systems can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The crawler and index systems and any sub systems may be implemented on a single device or distributed across multiple devices.

As shown in FIG. 5, the search engine server system includes: a crawler system 501, configured to obtain web pages with the same or approximately the same content; and an index system 502, configured to determine the generation time of each web page and a first evaluation value of each web page, and determine a second evaluation value of a web page with the earliest generation time, according to the first evaluation value of each web page.

In some embodiments, the index system may be further configured to determine whether each web page has the same or approximately the same content according to the MD5 of the web page.

A web page obtaining sub system of crawler system 501 may include: an MD5 generating unit, configured to obtain an intermediate paragraph with the longest content in each web page which is neither the first paragraph nor the last paragraph, or the longest sentence in a paragraph which is neither the first sentence nor the last sentence, and generate the MD5; a comparing unit, configured to determine whether the content of the web pages is the same according to their MD5 (i.e. digital fingerprint); and an obtaining unit, configured to obtain the web pages with the same or approximately the same content after determining whether the content of the web pages is the same according to their MD5.

In some embodiments, the index system may be further configured to determine the generation time of a web page according to the time contained in a web page URL and/or according to the time within a content-type web page.

In some embodiments, the index system may be further configured to, when determining the second evaluation value of the web page with the earliest generation time based on the first evaluation value of each web page, determine that the second evaluation value is the product of the sum of the first evaluation values of the web pages with the same or approximately the same content as the web page with the earliest generation time and the first weighting coefficient, plus the product of the first evaluation value of the web page with the earliest generation time and the second weighting coefficient.

In some embodiments, the index system may be further configured to determine the first evaluation value of each web page according to an evaluation value formed according to data including external and internal links.

The index system may be further configured to rank the query results according to the first evaluation value of each web page and the second evaluation value.

In some embodiments, the index system may be further configured to display the number of reproduction times of a web page in the query results.

Figure 6:
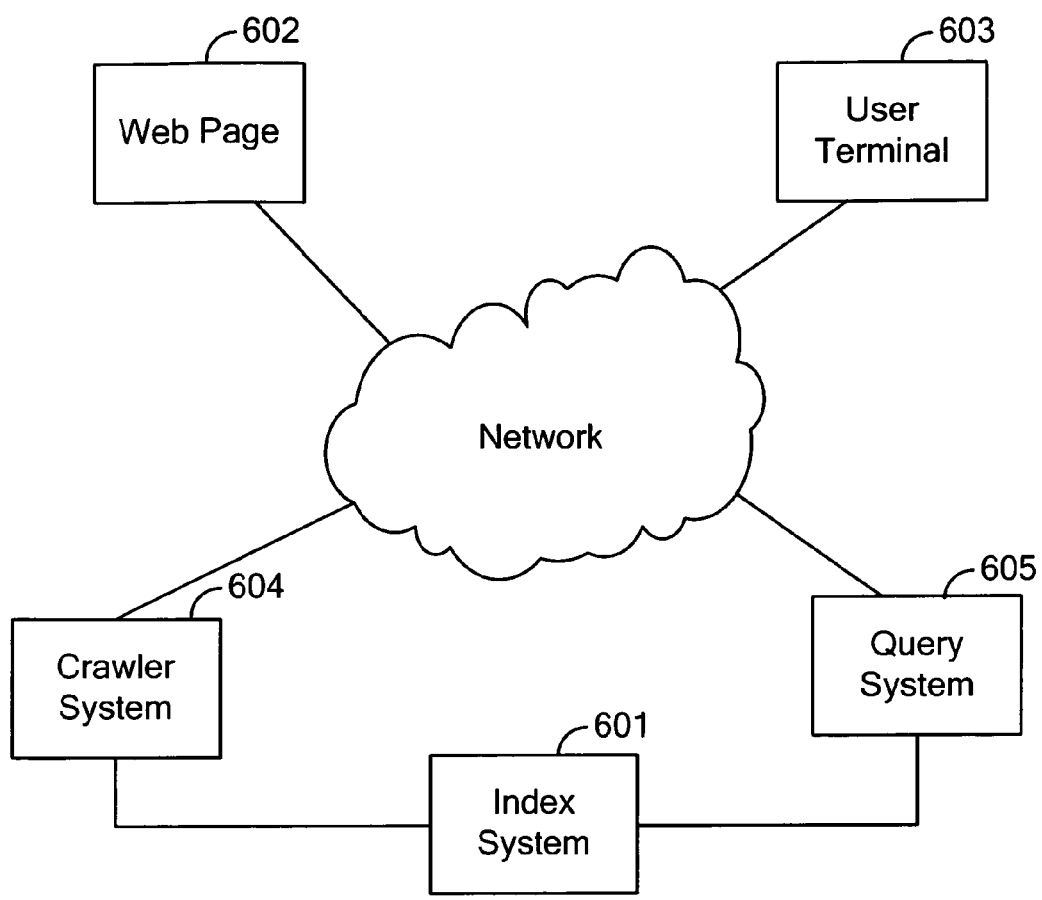
FIG. 6 is a block diagram of an embodiment of the application environment of a search engine server system.

FIG. 6 is a block diagram of an embodiment of the application environment of a search engine server system. As shown in FIG. 6, a network includes: an index system 601 (which ranks the query results according to the web page evaluation value); a web page 602 (which may also represent the various entities that generate the web pages, such as a server, etc.; for a convenient description, the web page may represent such an entity, or even multiple such entities); a user terminal 603; a crawler system 604; and a query system 605. In some embodiments, there may be multiple such user terminals 603. It may also be seen from the figure that the index system 601 and the crawler system 604 may form a search engine server system. In FIG. 6, various functional entities may be connected via a network, connected directly, or however is practically required. For example, the crawler system and the index system may be connected via a network such as the Internet, or a Local Area Network (LAN), so that the data interaction can be realized between the entities.

In some embodiments, the web page 602 provides various web page content, which the crawler system 604 may collect as web page information in the network and store on one or more servers. In some embodiments, index system 601 establishes an index according to the collected web page information so that a query request may be processed rapidly. The index system 601 may also determine the first evaluation value and the second evaluation value of a web page, and sequence the web pages according to the first evaluation value and the second evaluation value. The ranking may be performed immediately after the crawler system collects the web page information. Or the ranking may be performed after a query request is received from a user terminal. The relative time at which the ranking is performed is not limited thereof.

When the user terminal 603 queries the query system 605 via the network, the query system 605 may return the information requested (i.e. search results) by the user terminal 603 in the sequence determined by index system device 601. This way, the query result sequence obtained by the user may be accurate and may actually reflect the relationships (e.g. relative degrees of relevance to the user's query) between the query results.

It can be seen from the above embodiments that the number of reproduction times of a web page content and the Copy Rank value calculated based on the number of reproduction times are used. The Copy Rank is a parameter that can improve the sequence of the search engine relevance degree and is applicable to improve the ranking of search results to a content-type search query. The Copy Rank of an original web page can be calculated based at least on the number of reproduction times of a certain web page content (e.g. a news article) on the Internet, and the reproduced web pages can also be aggregated. Therefore, when a search engine calculates relevance degree, a new relevance degree value may be calculated by combining traditional parameters for calculating the relevance degree, such as the evaluation value formed according to data including external links (e.g. Page Rank) and the keyword matching degree, with the currently proposed Copy Rank parameter. When the search engine displays the results, it may also display the number of reproduction times of the queried content in order to help a user quickly determine the best result on the Internet that relates to the query word and thereby improve the accuracy of the results returned by the search engine. As is known in the art, the search engine may include a web page search engine component, a picture search engine component and a software search engine component.

In some embodiments, a new ranking parameter (e.g. Copy Rank) is included in the ranking of the search results of the search engine, for improving the relevance of search results of the content-type query words to the satisfaction of a search engine user.

Figure 7:
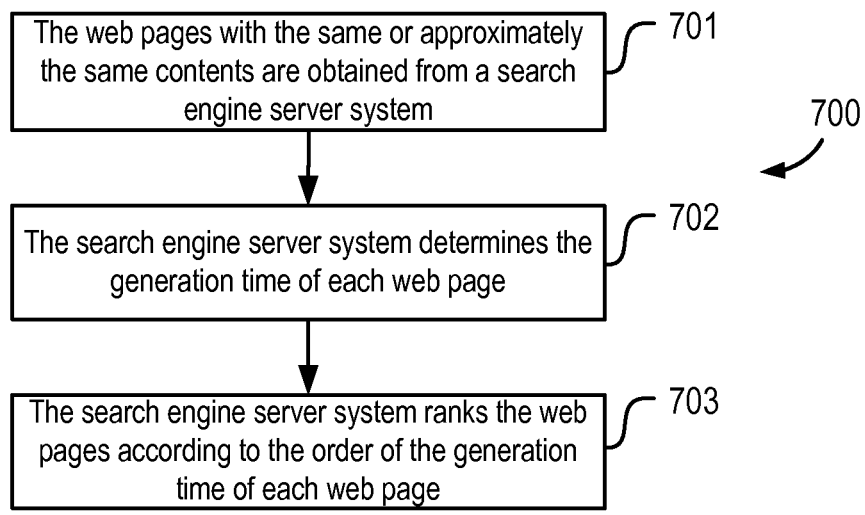
FIG. 7 is a flow chart of an embodiment of a method for ranking query results of web page search.

FIG. 7 is a flow chart of an embodiment of a method for ranking query results of web page search. Process 700 may be performed on the systems of FIG. 5, FIG. 6, and FIG. 8, for example. As shown in FIG. 7, the method may include the following for the method of ranking:

At 701: the web pages with the same or approximately the same content are obtained from a search engine server system.

At 702: the search engine server system determines the generation time of each web page. Techniques for determining the generation time are similar as those described above in connection with FIG. 2.

At 703: the search engine server system ranks the web pages based at least on the generation time of each web page. The earlier pages are ranked higher in some embodiments.

In some embodiments, the search engine server system ranks the web pages further based on the generation time and the external link data of each web page.

Figure 8:
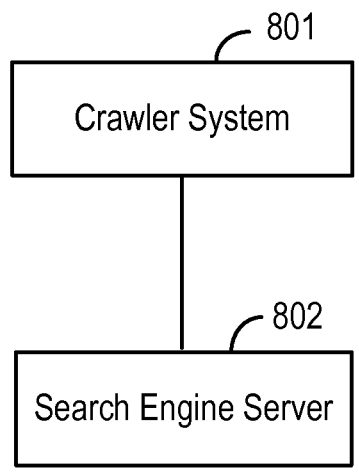
FIG. 8 is a structural representation of an embodiment of a search engine server system.

FIG. 8 is a block diagram of an embodiment of a search engine server system. The search engine server system shown in this example includes: a crawler system 801, configured to obtain web pages with the same or approximately the same content from a search engine server system; a search engine server 802, configured to determine, by the search engine server system, the generation time of each web page and rank the web pages according to the order of the generation time of each web page.

The search engine server 802 may be further configured to rank the web pages according to the generation time and the external link data of said each web page.

The systems and sub systems shown in FIGS. 5, 6 and 8 may be implemented as software components executing on one or more processors, as hardware such as programmable logic devices and/or Application Specific Integrated Circuits designed to perform certain functions or a combination thereof. In some embodiments, the sub systems can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. Each system/sub-system may be implemented on a single device or distributed across multiple devices.

One skilled in the art should understand that, the embodiments of the invention may be provided as a method, a system or a computer program product. Therefore, embodiments of the invention may be in the form of full hardware embodiments, full software embodiments or a combination thereof. Moreover, embodiments of the invention may be in the form of a computer program product that is implemented on one or more computer-usable storage media (including, without limitation, magnetic disk storage, CD-ROM and optical storage) containing computer-usable program codes.

Embodiments of the invention are described referring to the flow chart and/or block diagram of the method, device (system) and computer program product according to the embodiments of this application. It should be understood that, each flow and/or block in the flow chart and/or block diagram and the combination of flow and/or block in the flow chart and/or block diagram may be realized via computer program instructions. Such computer program instructions may be provided to the processor of a general-purpose computer, special-purpose computer, a built-in processor or other programmable data processing devices, to produce a machine, so that the instructions executed by the processor of a computer or other programmable data processing devices may produce a device for realizing the functions specified in one or more flows in the flow chart and/or one or more blocks in the block diagram.

Such computer program instructions may also be stored in a computer-readable storage that can guide a computer or other programmable data processing devices to work in a specific mode, so that the instructions stored in the computer-readable storage may produce a manufacture including a commander equipment, wherein the commander equipment may realize the functions specified in one or more flows of the flow chart and one or more blocks in the block diagram.

Such computer program instructions may also be loaded onto a computer or other programmable data processing devices, so that a series of operational processes may be executed on the computer or other programmable devices to produce a computer-realized processing, thereby the instructions executed on the computer or other programmable devices may provide a process for realizing the functions specified in one or more flows in the flow chart and/or one or more blocks in the block diagram.

Although some embodiments of the invention have been described above, other variations and modifications can be made based on the teaching of the basic inventive concept. Therefore, such embodiments and all these variations and modifications thereof are intended to be understood with the claims.

It will be appreciated that one skilled in the art may make various modifications and alterations to the present invention without departing from the spirit and scope of the present invention. Accordingly, if these modifications and alterations to the embodiments of the invention fall within the scope of the claims of the present invention and their equivalents, the present invention intends to include all these modifications and alterations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:

obtaining a search query;

obtaining a set of search results in response to the search query, wherein the set of search results includes a plurality of web pages with the same or approximately the same content;

determining a plurality of first evaluation values that indicate relevance degrees of the respective ones of the plurality of web pages, wherein a first evaluation value of the plurality of first evaluation values comprises a first ranking parameter;

determining, using one or more processors, an original web page from the plurality of web pages based on a plurality of generation times of the respective ones of the plurality of web pages, wherein the original web page comprises a web page of the plurality of web pages associated with an earliest generation time of the plurality of generation times;

determining a second evaluation value associated with the original web page based at least in part on the plurality of first evaluation values, wherein the second evaluation value comprises a second ranking parameter and wherein the second ranking parameter is different from the first ranking parameter; and displaying a search result corresponding to the original web page among the set of search results based at least in part on the second evaluation value associated with the original web page; and displaying with the search result corresponding to the original web page, a value determined based at least in part on a quantity of reproductions of content associated with the original web page, wherein the value is determined based at least in part on the plurality of web pages other than the original web page.

2. The method of claim 1, wherein the plurality of web pages are determined based at least in part on:

comparing a first fingerprint value associated with a first web page of the plurality of web pages to a second fingerprint value associated with a second web page of the plurality of web pages; and determining that the first fingerprint value matches the second fingerprint value.

3. The method of claim 2, wherein the first fingerprint value is determined based at least in part on a selected portion of content associated with the first web page.

4. The method of claim 1, wherein the first evaluation value of the plurality of first evaluation values is determined based at least in part on one or more links included in the respective web page of the plurality of web pages.

5. The method of claim 1, wherein the second evaluation value associated with the original web page is determined based on a combination of a first evaluation value corresponding to the original webpage from the plurality of first evaluation values and a sum of first evaluation values corresponding to those web pages other than the original web page from the plurality of first evaluation values.

6. The method of claim 1, further comprising including the original web page in a white list associated with original web pages.

7. The method of claim 1, wherein displaying the search result corresponding to the original web page among the set of search results based at least in part on the second evaluation value associated with the original web page includes ranking the search result corresponding to the original web page among the set of search results based at least in part on the second evaluation value associated with the original web page.

8. A system comprising:
one or more processors configured to:
obtain a search query;
obtain a set of search results in response to the search query, wherein the set of search results includes a plurality of web pages with the same or approximately the same content;
determine a plurality of first evaluation values that indicate relevance degrees of the respective ones of the plurality of web pages, wherein a first evaluation value of the plurality of first evaluation values comprises a first ranking parameter;
determine an original web page from the plurality of web pages based on a plurality of generation times of the respective ones of the plurality of web pages, wherein the original web page comprises a web page of the plurality of web pages associated with an earliest generation time of the plurality of generation times;
determine a second evaluation value associated with the original web page based at least in part on the plurality of first evaluation values, wherein the second evaluation value comprises a second ranking parameter and wherein the second ranking parameter is different from the first ranking parameter; and
display a search result corresponding to the original web page among the set of search results based at least in part on the second evaluation value associated with the original web page; and
display with the search result corresponding to the original web page, a value determined based at least in part on a quantity of reproductions of content associated with the original web page, wherein the value is determined based at least in part on the plurality of web pages other than the original web page; and
one or more memories coupled to the one or more processors and configured to provide the one or more processors with instructions.

9. The system of claim 8, wherein the plurality of web pages are determined based at least in part on:
comparing a first fingerprint value associated with a first web page of the plurality of web pages to a second fingerprint value associated with a second web page of the plurality of web pages; and
determining that the first fingerprint value matches the second fingerprint value.

10. The system of claim 9, wherein the first fingerprint value is determined based at least in part on a selected portion of content associated with the first web page.

11. The system of claim 8, wherein the first evaluation value of the plurality of first evaluation values is determined based at least in part on one or more links included in the respective web page of the plurality of web pages.

12. The system of claim 8, wherein the second evaluation value associated with the original web page is determined based on a combination of a first evaluation value corresponding to the original webpage from the plurality of first evaluation values and a sum of first evaluation values corresponding to those web pages other than the original web page from the plurality of first evaluation values.

13. The system of claim 8, wherein the one or more processors are further configured to include the original web page in a white list associated with original web pages.

14. The system of claim 8, wherein displaying the search result corresponding to the original web page among the set of search results based at least in part on the second evaluation value associated with the original web page includes ranking the search result corresponding to the original web page among the set of search results based at least in part on the second evaluation value associated with the original web page.

15. A computer program product, wherein the computer program product is embodied in a non-transitory computer readable storage medium and comprising computer instructions for:
obtaining a search query;
obtaining a set of search results in response to the search query, wherein the set of search results includes a plurality of web pages with the same or approximately the same content;
determining a plurality of first evaluation values that indicate relevance degrees of the respective ones of the plurality of web pages, wherein a first evaluation value of the plurality of first evaluation values comprises a first ranking parameter;
determining an original web page from the plurality of web pages based on a plurality of generation times of the respective ones of the plurality of web pages, wherein the original web page comprises a web page of the plurality of web pages associated with an earliest generation time of the plurality of generation times;
determining a second evaluation value associated with the original web page based at least in part on the plurality of first evaluation values, wherein the second evaluation value comprises a second ranking parameter and wherein the second ranking parameter is different from the first ranking parameter; and
displaying a search result corresponding to the original web page among the set of search results based at least in part on the second evaluation value associated with the original web page; and
displaying with the search result corresponding to the original web page, a value determined based at least in part on a quantity of reproductions of content associated with the original web page, wherein the value is determined based at least in part on the plurality of web pages other than the original web page.

* * * * *